(12) United States Patent
Apdalhaliem et al.

(10) Patent No.: US 9,470,828 B1
(45) Date of Patent: Oct. 18, 2016

(54) LOCAL LIGHT ATTENUATION FOR IMPROVING RELIABILITY OF ELECTRONIC DIMMABLE WINDOWS

(71) Applicant: The Boeing Company, Chicago, IL (US)

(72) Inventors: Sahrudine Apdalhaliem, Seattle, WA (US); Waeil M. Ashmawi, Bellevue, WA (US); Kimberly Dawn Meredith, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/744,795

(22) Filed: Jun. 19, 2015

(51) Int. Cl.
*G02F 1/03* (2006.01)
*G02B 5/23* (2006.01)
*G02B 5/20* (2006.01)
*G02F 1/01* (2006.01)
*B64C 1/14* (2006.01)

(52) U.S. Cl.
CPC .............. *G02B 5/23* (2013.01); *B64C 1/1484* (2013.01); *G02B 5/208* (2013.01); *G02F 1/0126* (2013.01)

(58) Field of Classification Search
CPC ...... G02B 5/23; G02B 1/0126; G02B 5/208; B64C 1/1484
USPC ....................................... 359/244, 275, 707
See application file for complete search history.

(56) References Cited

U.S. PATENT DOCUMENTS

| | | | | |
|---|---|---|---|---|
| 6,528,782 B1 * | 3/2003 | Zhang | ..................... | B60J 3/04 |
| | | | | 250/205 |
| 6,787,621 B2 * | 9/2004 | Kim | ..................... | C07D 333/56 |
| | | | | 430/496 |
| 2005/0104408 A1 | 5/2005 | Capps | | |
| 2005/0200934 A1 | 9/2005 | Callahan | | |
| 2013/0014315 A1 | 1/2013 | Valdez Diaz | | |

OTHER PUBLICATIONS http://www.transitions.com/en-us/why-transitions/the-technology/chromea7-technology/ printed on Mar. 13, 2015.
http://www.transitions.com/en-us/why-transitions/the-technology/photochromic-tech/ printed on Mar. 13, 2015.
"Do Photochromic Materials Have a Chance in the Smart Windows Market?", published Feb. 3, 2014 at http://nanomarkets.net/articles/do-photochromic-materials-have-a-chance-in-the-smart-windows-market by NanoMarkets, printed on Mar. 13, 2015.

* cited by examiner

*Primary Examiner* — Tuyen Tra
(74) *Attorney, Agent, or Firm* — Ostrager Chong Flaherty & Broitman P.C.

(57) ABSTRACT

A window system and method of attenuating light in a window system for improving usefulness and reliability of an electronic dimmable window in the window system. An automatically adjusting photochromatic material is integrated into a window pane of the window system such that the electronic dimmable window is positioned between the automatically adjusting photochromatic material in the window pane and a dust cover of the window system. The automatically adjusting photochromatic material is formulated to attenuate incoming light in a local area of the photochromatic material in response to a solar flux intensity of the incoming light in the local area being greater than or equal to a threshold intensity while areas outside the local area of the photochromatic material that are subjected to solar flux intensity less than the threshold intensity do not attenuate incoming light.

33 Claims, 10 Drawing Sheets

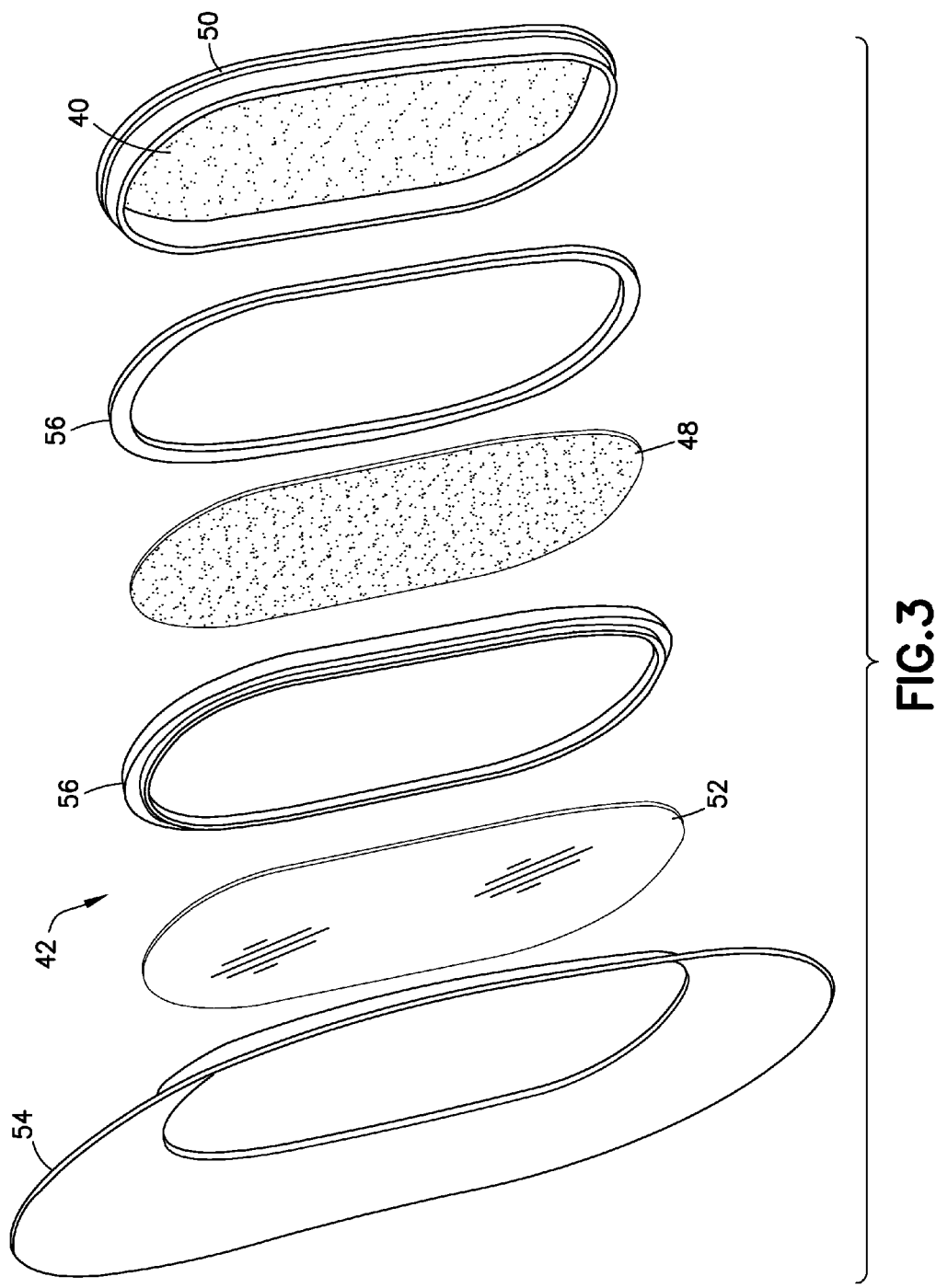

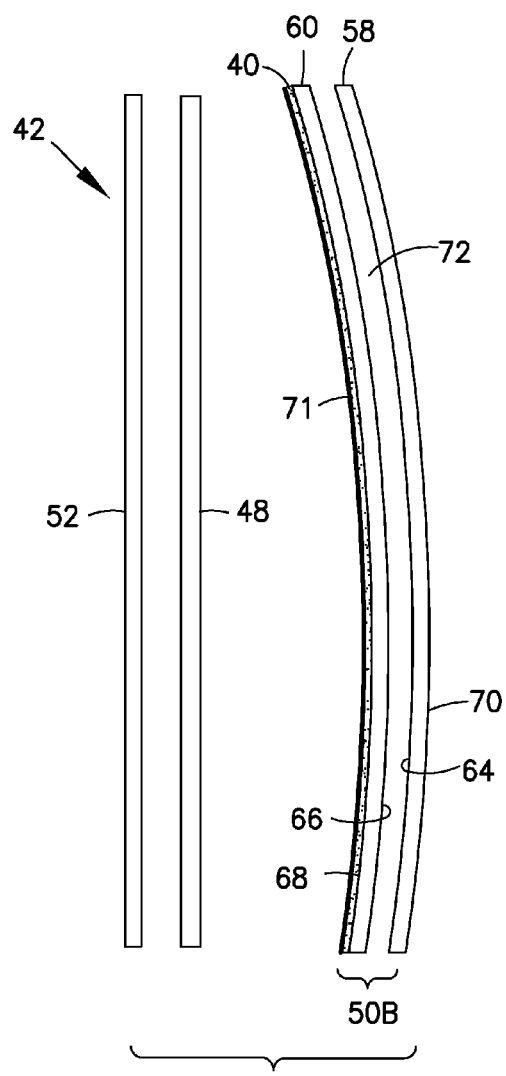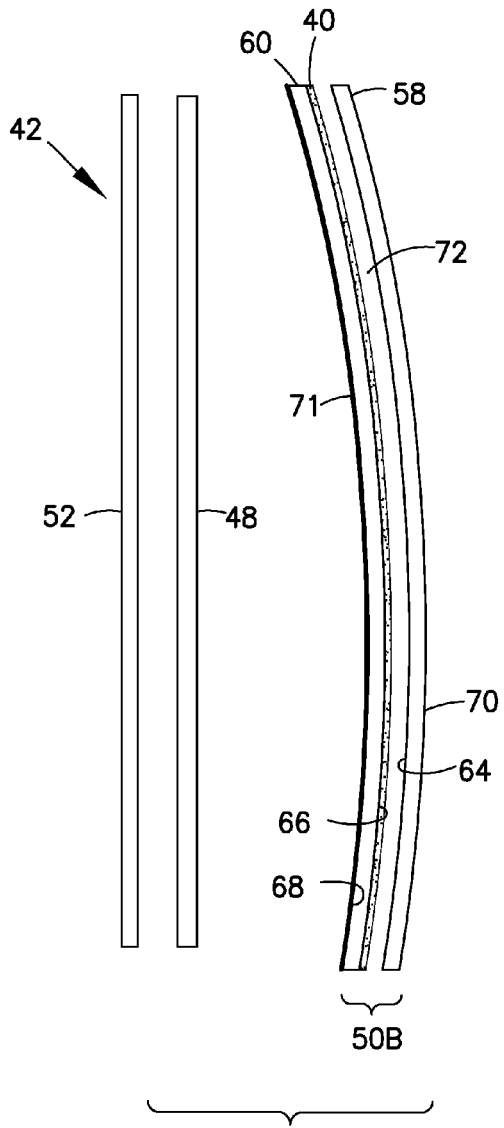

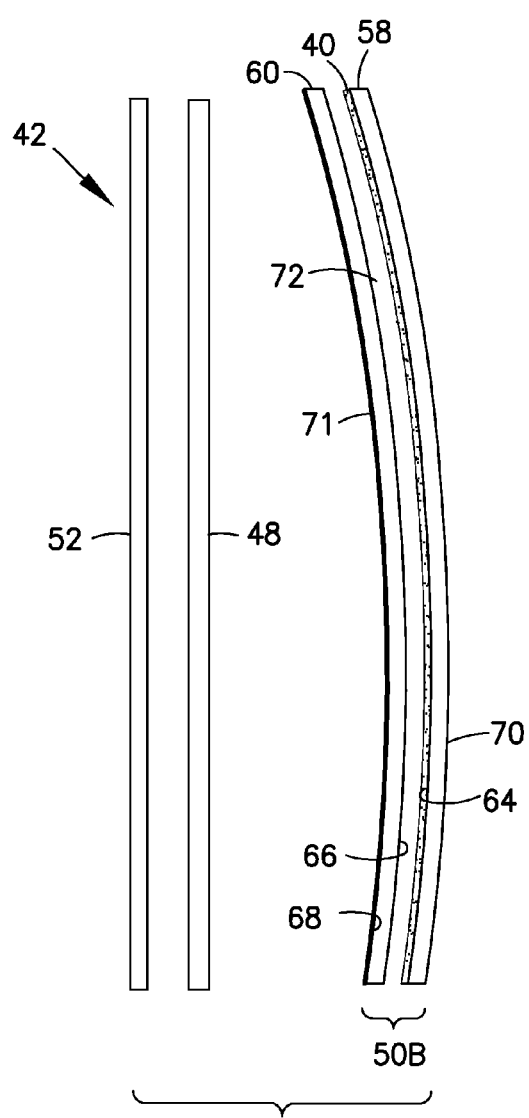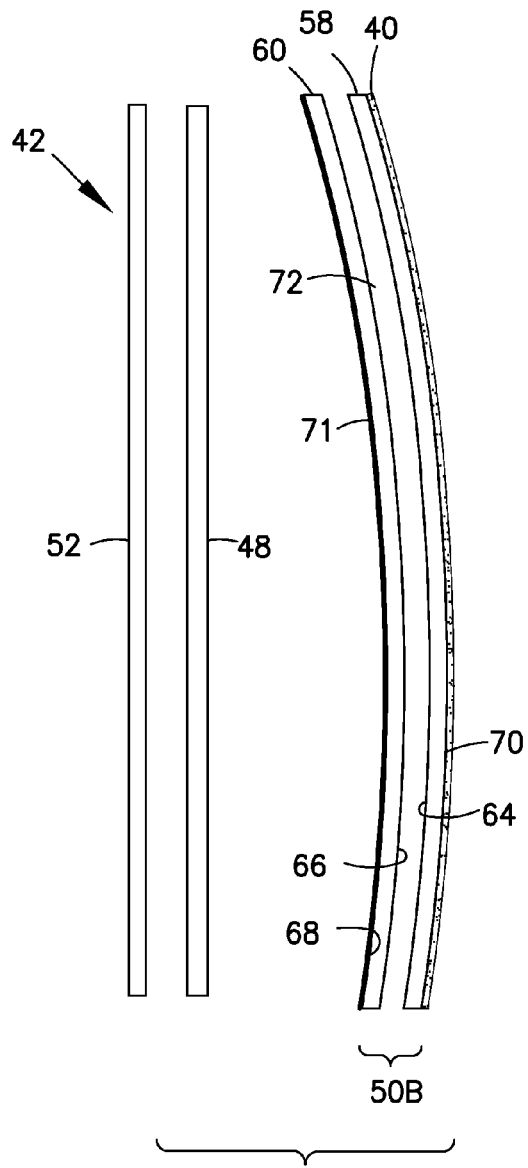

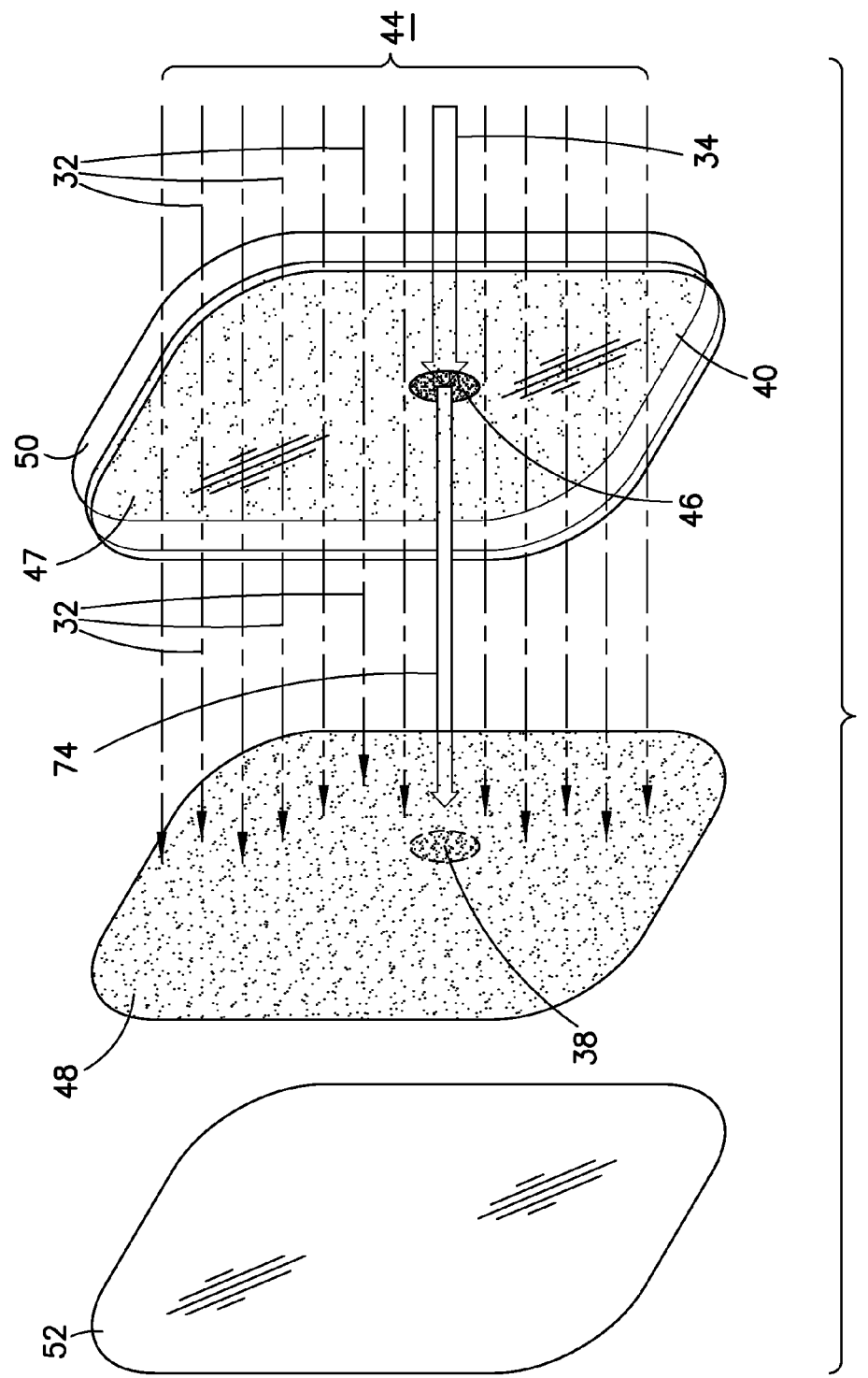

LOCAL LIGHT ATTENUATION FOR IMPROVING RELIABILITY OF ELECTRONIC DIMMABLE WINDOWS

TECHNICAL FIELD

This disclosure relates generally to electronic dimmable windows and, more particularly, to window systems and methods for attenuating local light intensity to improve reliability of electronic dimmable windows.

BACKGROUND

Electronic dimmable windows are becoming increasingly common in a wide variety of industries, such as on vehicles and in building construction. They provide the ability to change color or degree of opacity of the window, and thereby adjust light transmission through the window, simply by switching a controlling electrical power signal. Electronic dimmable windows are typically multi-layer assemblies. Outer layers of the electronic dimmable window typically are electrodes that are optically clear (i.e., substantially transparent to light in wavelengths of the visible spectrum or at other desired wavelengths, albeit in some instances bearing a limited tint or color). At least one electrochromic layer is sandwiched between the outer electrode layers. The electrochromic layer is able to change color or opacity in response to changes in an applied electric field or current to create visual effects. The electrochromic layer is often an organic polymer film or an inorganic thin film of electrochromic material. When an electric field is applied to the outer electrode layers, ions in an electrolyte typically move to the electrochromic layer causing the electrochromic material to change color states. Reversing the electric field moves ions away from the electrochromic layer, restoring the device to its previous state. Electrolytes may be in the form of a liquid or gel.

In the aerospace industry, electronic dimmable windows have started to replace pull down shades of windows in passenger cabins of aircraft, such as commercial airliners. Aircraft window systems generally include a window pane formed with a window outer pane and window inner pane arranged in a stacked configuration adjacent to each other. An electronic dimmable window is positioned adjacent the window inner pane. A dust cover is positioned adjacent the electronic dimmable window such that the electronic dimmable window is between the dust cover and the window pane. Thus, the window pane forms an outer surface when coupled with an aircraft fuselage and the dust cover forms an inner surface within the passenger cabin. Additional components may be provided in the window system.

Cracks may form in electronic dimmable windows in aircraft window systems during in-flight operation, particularly in window systems located proximate the wings of an aircraft, and more particularly in window systems located proximate the wings of an aircraft having wings with deflected wing tips. Such localized cracks make the electronic dimmable window less effective, but do not otherwise affect the window systems.

FIG. 1 shows a partial front view of a typical aircraft 10 having wings 12 with a deflected wing tip 14 deflected in an upward direction from the plane 16 of the wings 12. In such aircraft, direct sunlight 18 may directly impinge upon the aircraft 10, including the aircraft's window systems and thus the electronic dimmable windows in such window systems; and indirect sunlight 20, including multiple solar rays 22, may be reflected from the wing tips 14 and combined with the direct sunlight 18 to cause substantial increases in solar flux intensity directed through the window systems and electronic dimmable windows.

FIG. 2 is an exploded view of a typical window system 24 illustrating light rays passing through the window system. Such window systems 24 generally comprise a window pane 26, an electronic dimmable window 28 and dust cover 30, with the electronic dimmable window 28 positioned adjacent and between the window pane 26 and the dust cover 30. Direct sunlight 18 generally forms uniform direct rays 32 that pass through the window panes 26. The multiple solar rays 22 of indirect sunlight 20 generally form one or more localized spikes of high solar flux intensity 34 where the direct sunlight 18 and indirect sunlight 20 are combined, which can fluctuate in location and intensity. When the electronic dimmable window 28 is in a dark mode (i.e., such that it blocks out sunlight), the one or more localized spikes of high solar flux intensity 34 penetrate onto the electronic dimmable window 28 in a local area 38, resulting in much higher energy absorption in the local area 38. Higher energy absorption causes a spike in the temperature of the electronic dimmable window 28 in the local area 38 but not in other areas, i.e., there is a non-uniform temperature excursion in the electronic dimmable window 28, and causes cyclic high local thermal induced stresses in the local area 38 of the electronic dimmable window as the localized spikes of high solar flux intensity 34 fluctuate, ultimately initiating a crack 36 in the electronic dimmable window 28 at the local area 38. It would therefore be beneficial to minimize or eliminate spikes of high solar flux intensity 34 to avoid high local thermal induced stresses and the resulting cracks to improve the usefulness and reliability of electronic dimmable windows.

SUMMARY

The foregoing purposes, as well as others that will be apparent, are achieved generally by providing a self-activated photochromatic coating in or on the window pane of a window system that darkens (or activates) in a local area of the photochromatic coating when solar flux intensity passing through the local area is above a threshold intensity. Non-activated areas of the photochromatic coating do not darken, thus maintaining visibility through the window system. The darkening of the local area reduces the solar flux intensity that is transmitted through the photochromatic coating at the local area to an acceptable level below the threshold intensity by absorbing some of the incoming solar flux intensity. This maintains a more uniform temperature distribution in the electronic dimmable window, and reduces local thermal induced stresses and the chance that cracks will form in the electronic dimmable window.

In the disclosed embodiments, window systems and methods of attenuating light in window systems are provided for improving usefulness and reliability of electronic dimmable windows in the window systems. An automatically adjusting photochromatic material is integrated into a window pane of a window system such that the electronic dimmable window is positioned inboard of the automatically adjusting photochromatic material, and between the automatically adjusting photochromatic material in the window pane and a dust cover of the window system. The automatically adjusting photochromatic material is formulated to attenuate incoming light in a local area of the photochromatic material in response to a solar flux intensity of the incoming light in the local area being greater than or equal to a threshold intensity while areas outside the local area of the photochromatic material that are subjected to solar flux intensity less than the threshold intensity do not attenuate incoming light. The automatically adjusting photochromatic material is formulated to reflect or absorb, and therefore attenuate intensity of, light waves in the infrared and visible spectrums having a wavelength from 390 to 2500 nanometers. In various embodiments, window panes in the window systems comprise a window outer pane and a window inner pane, and the photochromatic material may be positioned on any of the inner surfaces or outer surfaces of the window outer pane and window inner pane.

Further areas of applicability and advantages of the disclosed window systems and methods of attenuating light in a window system will become apparent when the detailed description is considered in conjunction with the following drawings. It should be understood that the detailed description and specific examples are intended for purposes of illustration only and are not intended to limit the scope of the disclosure.

BRIEF DESCRIPTION OF THE DRAWINGS

Various embodiments will be hereinafter described with reference to drawings for the purpose of illustrating the foregoing and other aspects of the disclosure.

FIG. 3 is an illustration of an exploded view of a window system in accordance with this disclosure.

FIGS. 5A-5D are illustrations of partial exploded side views of four alternative embodiments of window systems in accordance with this disclosure showing different positions for integrating a photochromatic material in or on a non-laminated window pane of the window system.

FIG. 6 is an illustration of a partial exploded side view of a window system in accordance with this disclosure showing light rays transmitting through the window system.

DETAILED DESCRIPTION

Figure 1:
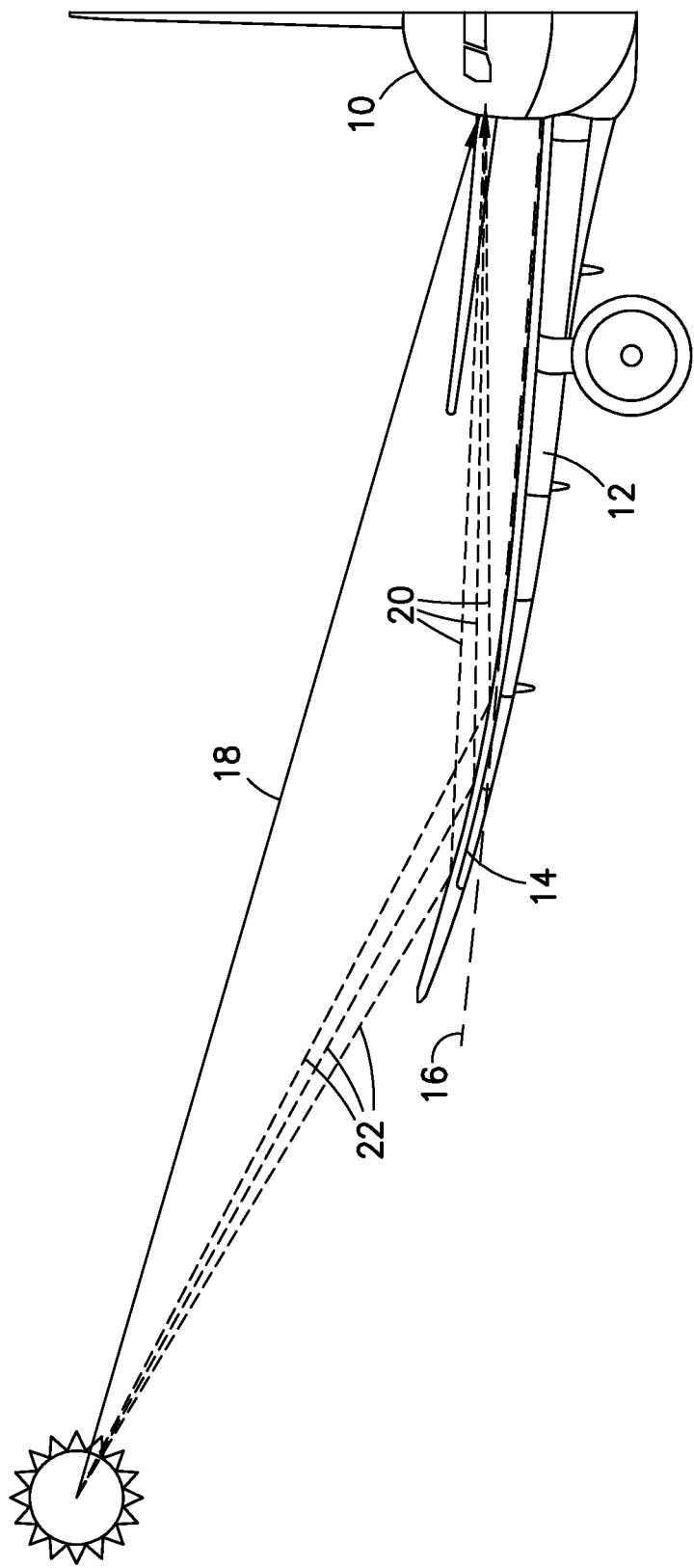
FIG. 1 is an illustration of a partial front view of an exemplary aircraft showing how sunlight may impinge upon the aircraft.

In the following detailed description, various embodiments of an apparatus, systems and methods for locally attenuating light in a window system are described to illustrate the general principles of the present disclosure. The disclosed apparatus, systems and methods are suitable for use in a wide variety of aircraft and aerospace applications where an airborne vehicle may experience a spike in high intensity solar flux passing through windows of the airborne vehicle. This disclosure is merely exemplary in nature and is in no way intended to limit the scope of the disclosed apparatus, systems and methods, their applications or their uses. It will be immediately recognized by one skilled in the art that the present disclosure may be practiced in other analogous applications or environments and/or with other analogous or equivalent variations of the illustrative embodiments. For example, the disclosed window systems and methods of attenuating light are just as readily adapted for use with ground-based vehicles or ground-based structures wherein the abilities to attenuate light transmitted through a window system are desired, and for other types of window systems comprising an electronic dimmable window. It should also be noted that those methods, procedures, components, or functions which are commonly known to persons of ordinary skill in the field of the disclosure are not described in detail herein.

Referring to FIGS. 3 through 6, a self-activated photochromatic coating 40 is integrated into an aircraft window system 42 to attenuate incoming light 44 in a local area 46 of the photochromatic coating 40 when solar flux intensity of the incoming light 44 passing through the local area 46 is above a threshold intensity that could damage an electronic dimmable window 48 in the aircraft window system 42.

The aircraft window system 42 generally includes a window pane 50, an electronic dimmable window 48, which may be selectively dimmed, positioned adjacent the window pane 50, and a dust cover 52 positioned adjacent the electronic dimmable window 48 such that the electronic dimmable window 48 is between the dust cover 52 and the window pane 50. Thus, the window pane 50 forms an outer surface when coupled with an aircraft fuselage (not shown) and the dust cover 52 forms an inner surface within an aircraft cabin (not shown). The window pane 50 may be formed from glass, acrylic or any other transparent material suitable for the desired application. Additional components may be provided. For example, an inner reveal 54 may be provided adjacent the dust cover 52. The inner reveal 54 provides an aesthetic cover for the window system 42 within the aircraft cabin. Additionally, one or more support frames 56 may be positioned within the aircraft window system 42, illustrated between the window pane 50 and electronic dimmable window 48, as well as between the electronic dimmable window 48 and the dust cover 52. However, it should be noted that the configuration and positioning of the support frames 56 may be varied as desired or needed.

The window pane 50 is formed from a window outer pane 58 and a window inner pane 60. As can be seen, the portions of the window pane 50 are arranged in a stacked configuration with the window outer pane 58 and window inner pane 60 adjacent each other.

Figure 4A:
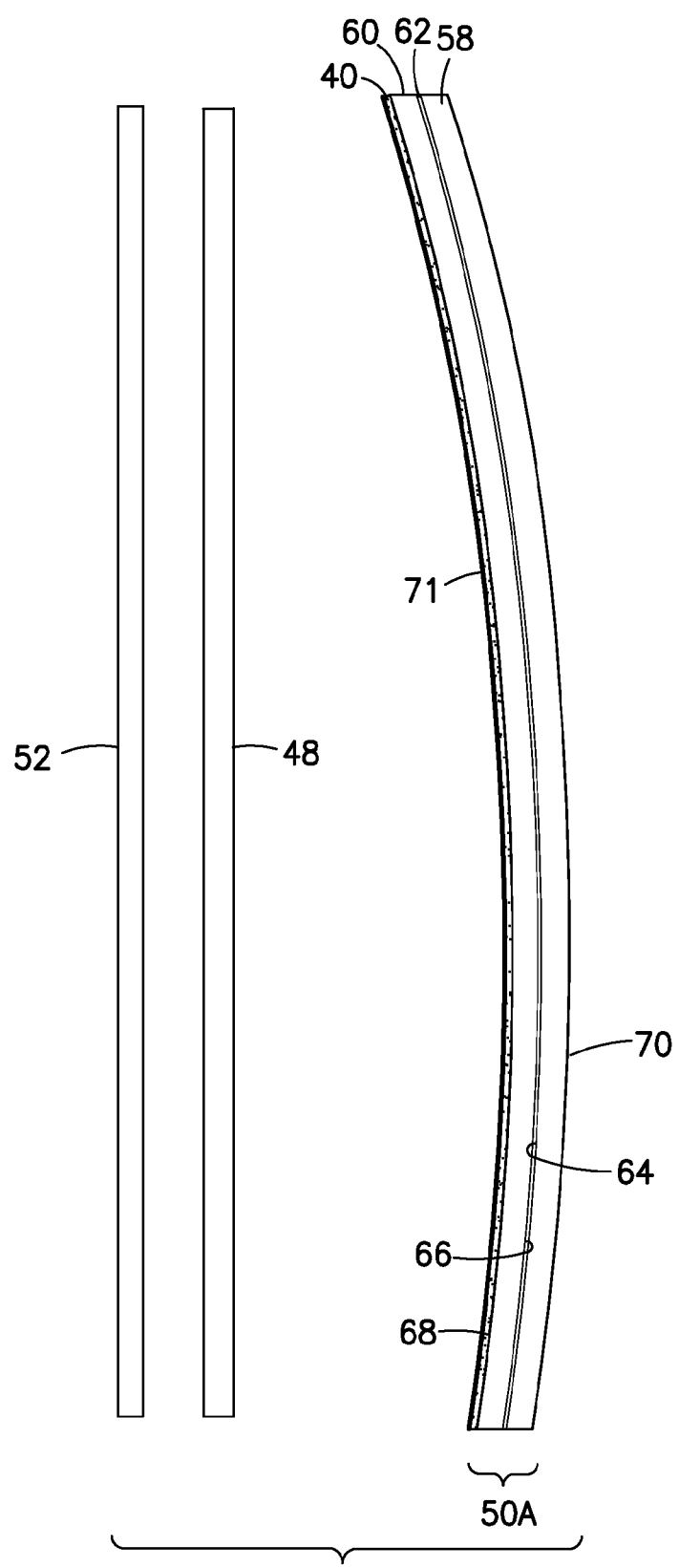
FIGS. 4A-4C are illustrations of partial exploded side views of three alternative embodiments of window systems in accordance with this disclosure showing different positions for integrating a photochromatic material in or on a laminated window pane of the window system.
Figure 4B:
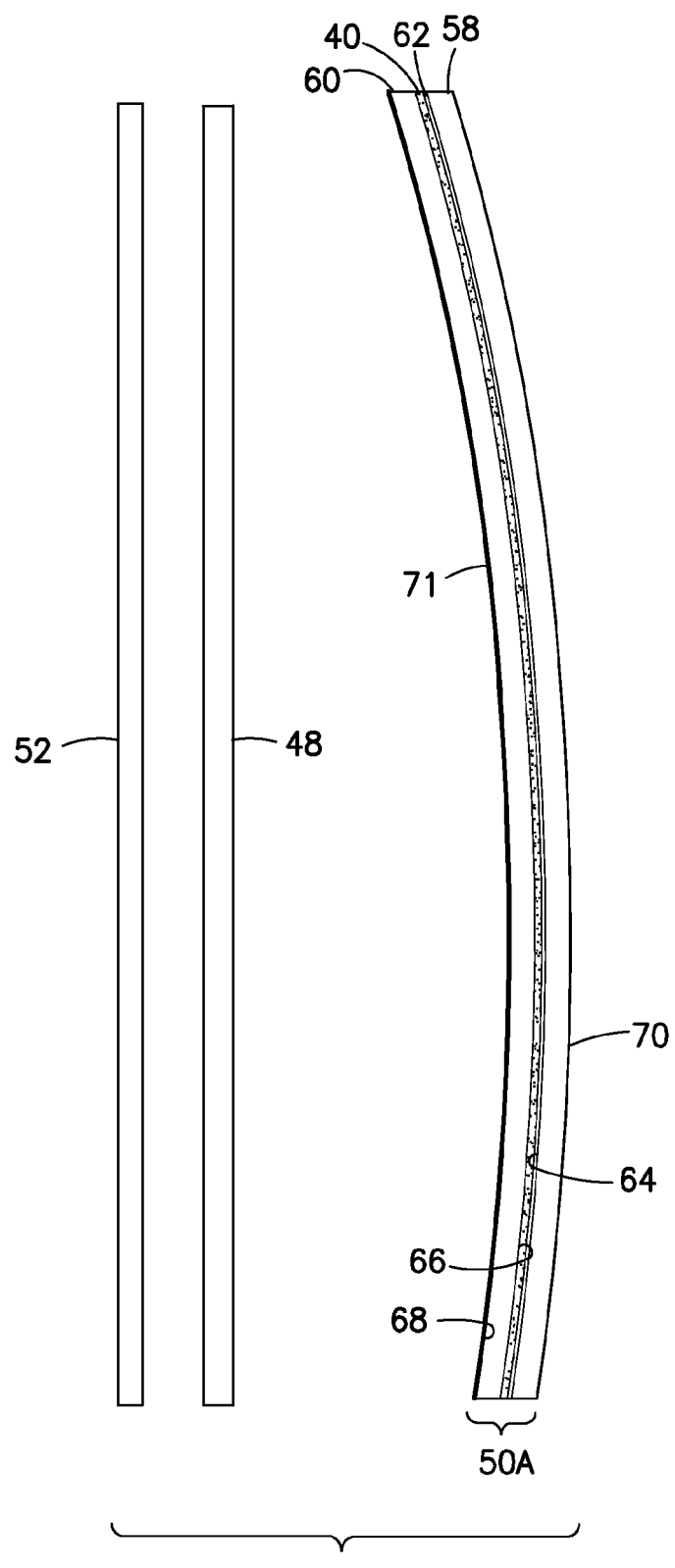
Figure 4C:
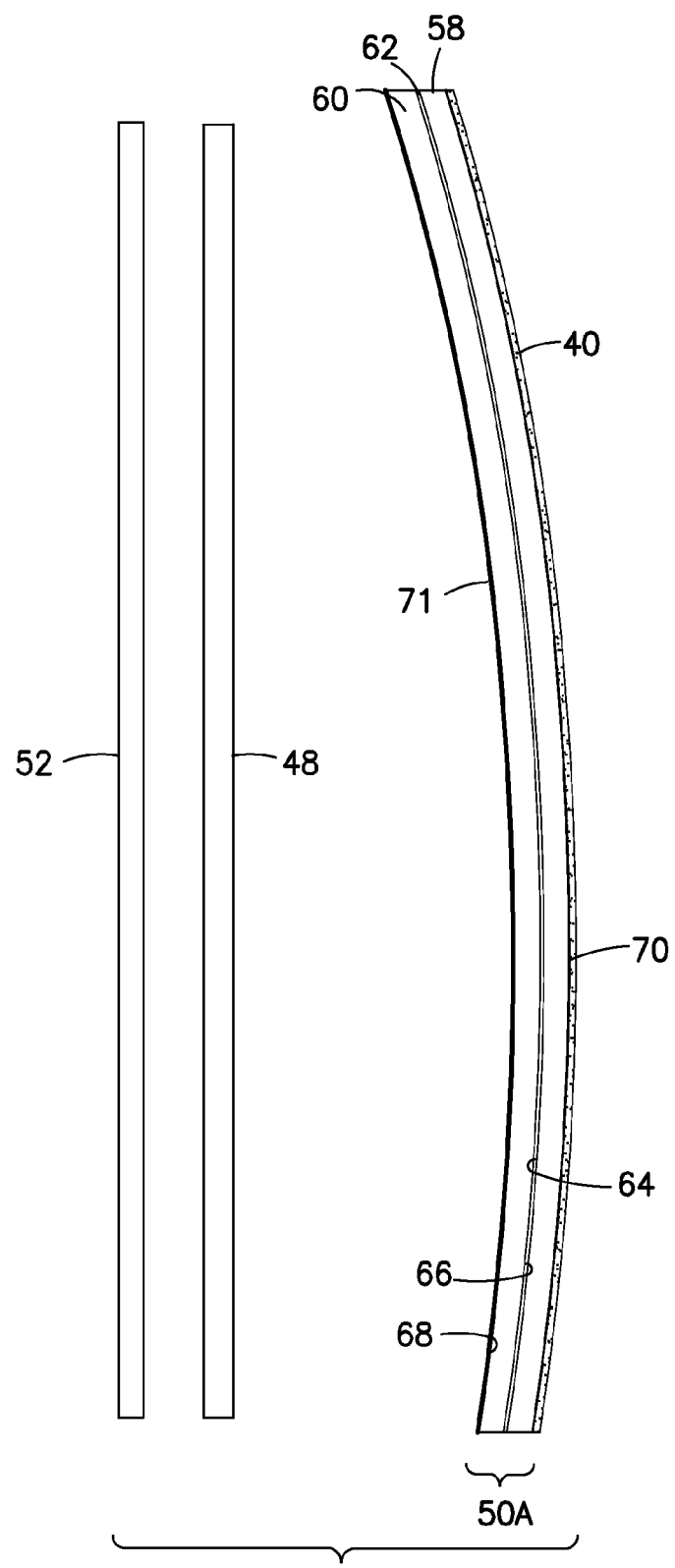

FIGS. 4A-4C illustrate an aircraft window system 42 with a laminated window pane 50A wherein the window outer pane 58 and the window inner pane 60 are bonded together at a bond line 62 between an inboard surface 64 of the window outer pane 58 and an outboard surface 66 of the window inner pane 60. In these embodiments, the photochromatic coating 40 may be integrated in or on the laminated window pane 50A in three locations: (i) on an inboard surface 68 of the inner pane 60 as shown in FIG. 4A; (ii) on the bond line 62 between the inboard surface 64 of the window outer pane 58 and the outboard surface 66 of the window inner pane 60 as shown in FIG. 4B; or (iii) on an outboard surface 70 of the window outer pane 58 as shown in FIG. 4C.

FIGS. 5A-5D illustrate an aircraft window system 42 with an alternative non-laminated window pane 50B wherein the non-laminated window pane 50 is formed with an air gap 72 between the window inner pane 60 and the window outer pane 58. In these embodiments, the photochromatic coating 40 may be integrated in or on the non-laminated window pane 50B in four locations: (i) on an inboard surface 68 of the window inner pane 60 as shown in FIG. 5A; (ii) on the outboard surface 66 of the window inner pane 60 as shown in FIG. 5B; (iii) on the inboard surface 64 of the window outer pane 58 as shown in FIG. 5C; or (iv) on the outboard surface 70 of the window outer pane 58 as shown in FIG. 5D.

The photochromatic coating 40 is bonded to the window pane 50 with a thin film (not shown), but may also be bonded with other materials with appropriate adhesive properties that do not interfere with the operation of the photochromatic coating 40 or the visibility of the aircraft window system 42. In some embodiments, an infrared reflective coating 71 in liquid, film or other forms may also be applied to either the laminated window pane 50A or the non-laminated window pane 50B on the inboard surface 68 of the window inner pane 60 or on any other surface of the laminated window pane 50A or the non-laminated window pane 50B to block out infrared waves from the incoming light 44.

Figure 2:
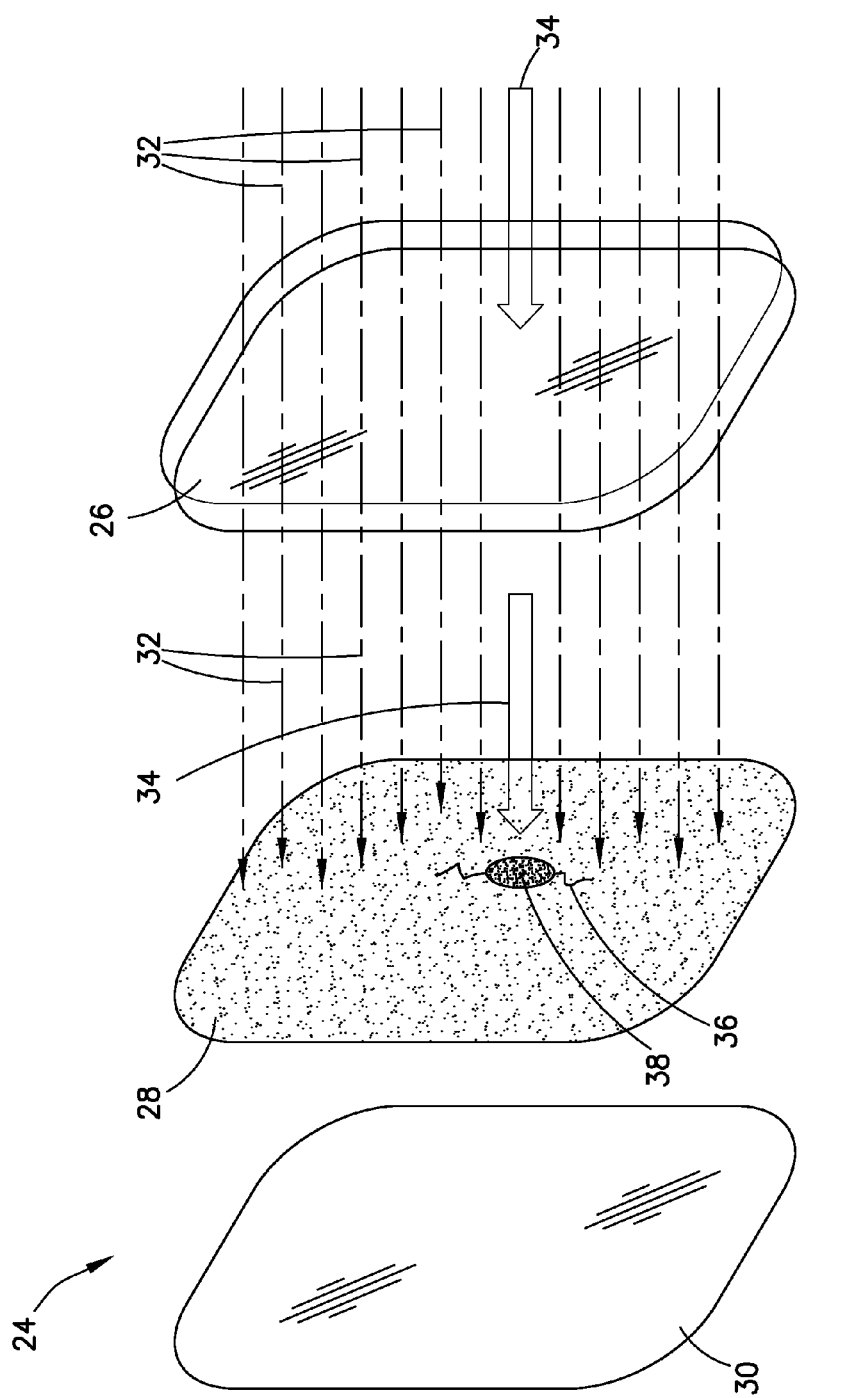
FIG. 2 is an illustration of a partial exploded side view of a typical window system comprising an electronic dimmable window showing light rays transmitting through the window system.

FIG. 6 is a partial exploded view of the aircraft window system 42 with a photochromatic coating 40 integrated in or on the window pane 50 and illustrating rays of incoming light 44 passing through the aircraft window system 42. As described with reference to FIGS. 1 and 2, direct sunlight 18 generally forms uniform direct rays 32 that pass through the window pane 50. Multiple solar rays 22 of indirect sunlight 20 generally form one or more localized spikes of high solar flux intensity 34 where the direct sunlight 18 and indirect sunlight 20 are combined. The location and intensity of any localized spikes of high solar flux intensity 34 may fluctuate depending on such factors as position of sun relative to the aircraft, aircraft paint color, surface area of the aircraft's reflective surfaces, such as a deflected wing tip 14, any surface treatments on the aircraft, the ratio of the area of the reflective surface to the area of the receiving surface, and atmospheric conditions. For example, lighter colors reflect more light than darker colors, glossy surfaces are more reflective, rough surfaces will result in light scattering. In FIG. 6, a single localized spike of high solar flux intensity 34 is shown transmitting through a local area 46 on the photochromatic coating 40.

In the disclosed aircraft window systems 42, the photochromatic coating 40 is formulated to activate in the local area 46 to attenuate the one or more localized spikes of high solar flux intensity 34 when the one or more localized spikes of high solar flux intensity 34 of the incoming light 44 in the local area 46 is greater than or equal to a threshold intensity. The threshold intensity to activate the photochromatic coating 40 is dependent on the configuration of the aircraft window system 42, including the thickness of the window pane 50 and whether or not an infrared reflective coating 71 is used.

When the electronic dimmable window 48 is in a dark mode (i.e., it is opaque such that it blocks out sunlight) as shown in FIG. 6, it absorbs maximum solar energy and rises in temperature. The temperature rise is sensitive to the amount of total solar energy flux the electronic dimmable window 48 absorbs. Table I shows the distribution and corresponding spectrum of solar energy from uniform direct sun light at sea level that is absorbed by a typical electronic dimmable window 48.

TABLE I

| Range | Wavelength (nm) | Solar Flux (W/m²) | Energy Distribution |
|---|---|---|---|
| Ultraviolet Spectrum | 0 to 390 | 27.4 | 8% |
| Visible Spectrum | 390 to 720 | 166.3 | 47% |
| Infrared Spectrum | 720 to 2500 | 160.7 | 45% |
| Long Wavelength | 2500 to end | 0.6 | 0% |
| Total: | | 355.0 | 100% |

In general, an aircraft window system 42 with an electronic dimmable window 48 in opaque mode will absorb about 78% of the incoming solar energy flux resulting from uniform direct sun light and/or indirect sunlight. The remaining 22% of the incoming solar energy flux is either reflected back to ambient (about 19%) or transmitted through the aircraft window system 42 (about 3%). The transmitted solar energy flux is primarily in the infrared spectrum. The absorbed solar energy flux is distributed among the components of the window system 42. The distribution of absorbed solar energy flux depends on whether or not a coating is used, the type of coating and the location of the coating. For example, Table II shows the distribution of solar energy flux in five configurations of an aircraft window system 42, the electronic dimmable window 48 (in opaque mode) absorbing a higher percentage of solar energy flux than the other components.

TABLE II

| | Energy Absorption Characteristics of Window | | | | Overall Window System Optical Characteristics | | |
|---|---|---|---|---|---|---|---|
| Window Configuration | Outer Pane | Inner Pane | EDW | Dust Cover | Window System Energy Absorbed (A) | Window System Energy Reflected (R) | Window System Energy Transmitted (T) |
| 1 Window-No EDW and No Coating | 11% | 2% | — | 1% | 16% | 5% | 79% |
| 2 Window with EDW (in opaque mode)-No Coating | 13% | 2% | 63% | 0% | 78% | 19% | 3% |
| 3 Window with EDW (in opaque mode) and Infrared | 12% | 19% | 46% | 0% | 78% | 19% | 3% |

TABLE II-continued

| Window Configuration | Energy Absorption Characteristics of Window | | | | Overall Window System Optical Characteristics | | |
|---|---|---|---|---|---|---|---|
| | Outer Pane | Inner Pane | EDW | Dust Cover | Window System Energy Absorbed (A) | Window System Energy Reflected (R) | Window System Energy Transmitted (T) |
| Coating on Inner Pane Inner Surface | | | | | | | |
| 4 Window with EDW (in opaque mode) and Infrared Coating on Outer Pane Inner Surface | 32% | 1% | 46% | 0% | 79% | 18% | 3% |
| 5 Window with EDW (in opaque mode) and Infrared Coating on Outer Pane Outer Surface | 31% | 1% | 46% | 0% | 78% | 19% | 3% |

In configuration number 2, the aircraft window system 42 absorbs 78% of the incoming solar energy flux, which is distributed as follows: 13% absorbed by the window outer pane 60, 2% absorbed by the window inner pane 58, and 63% absorbed by the electronic dimmable window 48. In configurations 3-5, the distribution differs depending on the location of an infrared reflective coating 71, but the electronic dimmable window 48 absorbs 46% of the incoming solar energy flux.

The one or more localized spikes of high solar flux intensity 34 that penetrate onto the local area 38 of the electronic dimmable window 48 typically cause much higher energy absorption and a temperature spike in the local area 38 of the electronic dimmable window 48, which can cause cracks in the electronic dimmable window 48. In general, it is desired to maintain the global temperature of an electronic dimmable window 48 below about 170° F. when in a dark mode, and keep sudden temperature spikes in a local area 46 of the electronic dimmable window 48 below about 200° F. The maximum solar flux energy that can be absorbed by the electronic dimmable window 48 to maintain the temperature of the electronic dimmable window 48 below about 200° F. is 417 btu/hr-ft$^2$. Any energy absorption by the electronic dimmable window 48 greater than 417 btu/hr-ft$^2$ could raise temperature well above 200° F. and cause cracks in the electronic dimmable window 40.

Because the electronic dimmable window 48 absorbs 63% or 46% of the incoming solar flux energy (depending on whether an infrared reflective coating 71 is used), the maximum allowable solar flux energy entering the aircraft window system 42 (from direct sunlight 18 and indirect sunlight 20) is about 660 btu/hr-ft$^2$ without an infrared reflective coating 71 and about 898 btu/hr-ft$^2$ with an infrared reflective coating 71 before the photochromatic coating 40 is activated (i.e., to attenuate the incoming solar energy flux). Therefore, the maximum incoming solar energy flux is preferably between about 660 btu/hr-ft$^2$ and about 898 btu/hr-ft$^2$.

The minimum solar flux energy at the photochromatic coating 40 that will activate the photochromatic coating 40 also depends on where the photochromatic coating 40 is positioned and whether or not an infrared reflective coating 71 is used. Table III shows several examples of a minimum threshold energy to activate a photochromatic coating 40 positioned either on the inboard surface 68 of the window inner pane 60 (FIGS. 4A and 5A) or the inboard surface 64 of the window outer pane 58 (FIGS. 4B and 5C).

TABLE III

| Window Configuration | EDW Critical Energy Flux Absorption (btu/hr-ft$^2$) | Maximum Allowable Incident Energy Flux (btu/hr-ft$^2$) | Minimum Photochromatic Coating Energy Threshold | |
|---|---|---|---|---|
| | | | Inner Pane Inboard Surface (btu/hr-ft$^2$) | Outer Pane Inboard Surface (btu/hr-ft$^2$) |
| 1 Window - No EDW and No Coating | | | | |
| 2 Window with EDW (in opaque mode) - No Coating | 417 | 660 | >15 | >84 |
| 3 Window with EDW (in opaque mode) and Infrared Coating on Inner Pane Inner Surface | 417 | 898 | >173 | >105 |
| 4 Window with EDW (in opaque mode) and Infrared Coating on Outer Pane Inner Surface | 417 | 898 | >7 | >284 |
| 5 Window with EDW (in opaque mode) and Infrared Coating on Outer Pane Outer Surface | 417 | 897 | >7 | >276 |

Therefore, referring to the data in Table III, for example, the photochromatic coating 40 may be formulated to activate when the solar flux energy is in the range of about 15 btu/hr-ft$^2$ to about 660 btu/hr-ft$^2$ in configuration number 2 when the photochromatic coating 40 is on the inboard surface 68 of the window inner pane 60; the photochromatic coating 40 may be formulated to activate when the solar flux energy is in the range of about 84 btu/hr-ft$^2$ to about 660 btu/hr-ft$^2$ in configuration number 2 when the photochromatic coating 40 is on the inboard surface 64 of the window outer pane 58; and the photochromatic coating 40 may be formulated to activate when the solar flux energy is in the range of about 276 btu/hr-ft$^2$ to about 897 btu/hr-ft$^2$ in configuration number 5 when the photochromatic coating 40 is on the inboard surface 64 of the window outer pane 58.

The photochromatic material 40 is also preferably formulated to reflect or absorb light waves in the infrared and visible spectrums having a wavelength from 390 to 2500 nanometers, and to have more tolerance at a nominal range of solar flux intensity on a sunny bright day (about 355 to 455 btu/hr-ft$^2$), such that it activates in the local area 46 when the solar flux intensity is several magnitude higher than the nominal range of solar flux intensity.

When the local area 46 in the photochromatic coating 40 is activated, it darkens to absorb some of the solar flux intensity in the one or more localized spikes of high solar flux intensity 34 and reduce the solar flux intensity that is transmitted through the photochromatic coating 40 at the local area 46 to an acceptable level 74 below the threshold intensity. Thus, the solar flux intensity that reaches the local area 38 of the electronic dimmable window 48 does not substantially induce thermal stresses or cracks in the electronic dimmable window 48. The size of the local area 46 that is activated could range from several microns in effective diameter to several inches depending on the nature of the incoming one or more localized spikes of high solar flux intensity 34.

At the same time, the photochromatic coating 40 is also formulated to maintain non-activated areas 47, outside the activated local area 46 of the photochromatic material 40, that are subjected to solar flux intensity less than the threshold intensity. The non-activated areas 47 of the photochromatic coating 40 do not attenuate incoming light 44 (i.e., they do not darken). In this way, the overall visibility through the window system is not compromised. The photochromatic coating 40 thus maintains a more uniform temperature distribution in the electronic dimmable window 48, and reduces local thermal induced stresses and the chance that cracks will form in the electronic dimmable window 48.

As used herein, the term "photochromatic" refers generally to a light attenuation characteristic (e.g., darkening) of a coating or material when exposed to a light intensity above a threshold intensity and that become more transparent when the light intensity decreases below the threshold intensity. Photochromatic materials are also known as "photochromic" or "photosensitive" materials. A variety of technologies may be employed to achieve the photochromatic characteristics disclosed herein. For example, photochromatic eyeglasses are well known, which automatically darken to function as sunglasses when the wearer is in bright sunlight. But, current industry photochromatic materials and coatings are formulated with more sensitivity to solar energy (combined ultraviolet and visible spectrum range) in such a way that the entire material or coated surface of a material reacts uniformly when exposed to sun light. Similar technologies, either presently known or hereinafter discovered, may be employed to formulate the disclosed photochromatic coatings 40 that permit local areas 46 of activation (i.e., local darkening) on the photochromatic coating 40 at the same time as maintaining non-activated areas 47 (with no darkening) to provide protection from one or more localized spikes of high solar flux intensity 34 while at the same time maintaining good visibility through the electronic dimmable window 48 and aircraft window system 42.

This result may be achieved by formulating the photochromatic coating 40 with a chemical compound known as Azobenzene with helical structures that are responsive to visible light. This is commonly used as a photoswitch in the molecular science industry. Typically, when the Azobenzene is exposed to visible light, the molecules undergo a chemical change that enables them to block visible light. The level of color change from light to dark is dependent on the solar flux energy absorbed by the photochromatic coating 40. The chemical makeup of the Azobenzene derivatives can be formulated further by adjusting its helical molecular structures to have higher potential energy well. If the global area is exposed to sunlight with energy lower than its potential energy well, then it will not change color and will remain clear. If the solar flux energy absorbed in a local area is higher than its Azobenzene potential energy well, then the local area will undergo chemical changes and change color.

The photochromatic coating 40 may be activated by heat generated in the window pane 50 from the one or more localized spikes of high solar flux intensity 34. The molecules in the photochromatic coating 40 translate or expand in such a way to restrict sun light passing through (i.e., transmittance) the photochromatic coating 40 and therefore reduce solar flux intensity transmitted to the electronic dimmable window 48. During the activation process, the photochromatic coating 40 will change color to darken in the local area 46. The approximate time for transition could range from about one minute to about 5 minutes depending on the solar flux intensity of the incoming light 44. Alternatively, the photochromatic coating 40 may be formulated to reflect the incoming light 44 similar to a mirror. The level of darkening of the photochromatic coating 40 is also dependent on the solar flux intensity of the incoming light 44, and can range from a light gray to a darker charcoal color.

The threshold intensity of the photochromatic coating 40 is determined based on configuration of the aircraft window system 42, including the configuration of the window pane 50 and whether an infrared reflective coating 71 is included. The threshold intensity should be formulated to maintain solar energy flux of the transmitted light through the photochromatic coating 40 less than 660 btu/hr-ft$^2$ without an infrared reflective coating 71 and less than 897 btu/hr-ft$^2$ with an infrared reflective coating 71.

Figure 7:
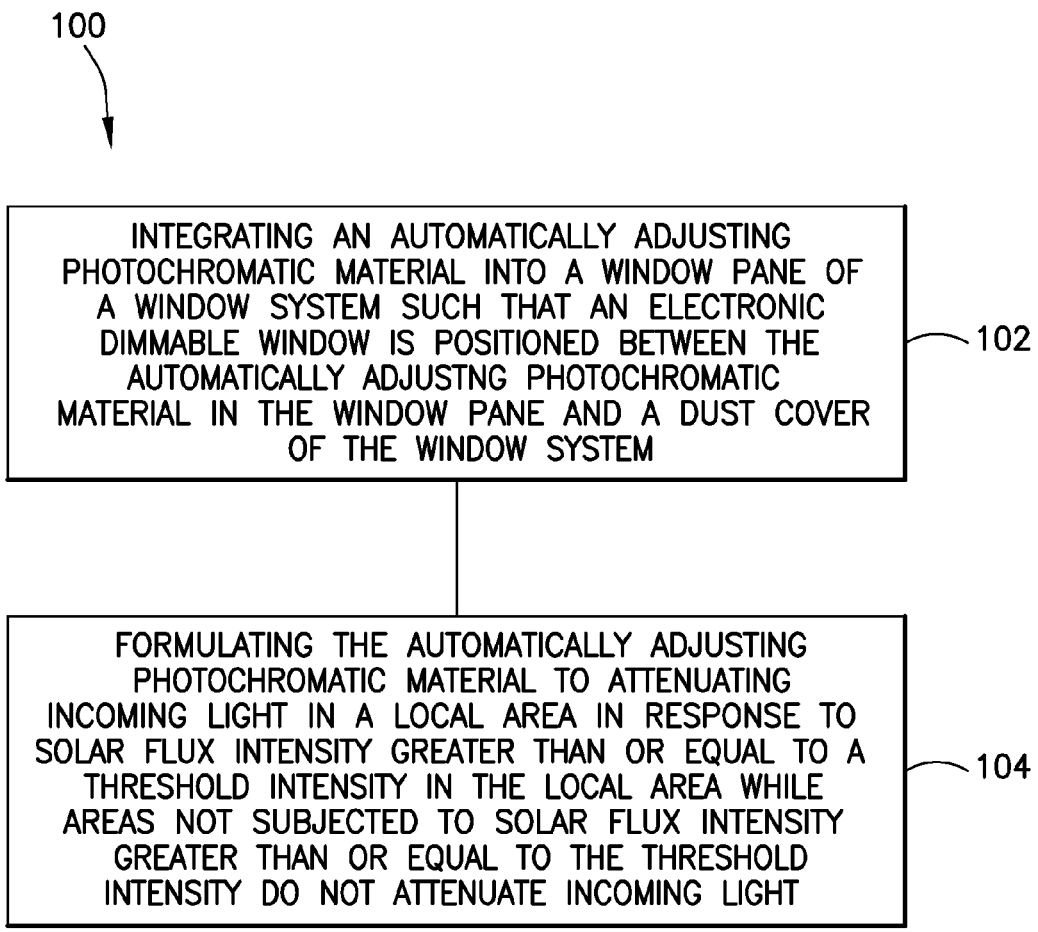
FIG. 7 is a flow diagram of a method of attenuating light in a window system in accordance with this disclosure.

FIG. 7 is a flow diagram illustrating steps of a method 100 of attenuating incoming light 44 in a window system, such as aircraft window system 42, comprising an electronic dimmable window 48. In step 100, an automatically adjusting photochromatic material 40 is integrated into a window pane 50 such that the electronic dimmable window 48 is positioned between the automatically adjusting photochromatic material 40 in the window pane 50 and a dust cover 52 in accordance with the disclosure herein. In step 102, the photochromatic material 40 is formulated to attenuate incoming light 44 in a local area 46 in response to solar flux intensity greater than or equal to a threshold intensity in the local area 46 while non-activated areas 47 not subjected to solar flux intensity greater than or equal to the threshold intensity do not attenuate incoming light 44.

While the invention has been described with reference to certain exemplary embodiments, such embodiments are for purposes of illustration and not limitation. It will be understood by those skilled in the art that various changes may be made and equivalents may be substituted for elements thereof without departing from the scope of the invention. In addition, many modifications may be made to adapt a particular situation to the teachings herein without departing from the essential scope thereof. Therefore it is intended that the claims not be limited to the particular embodiments disclosed. The method claims set forth hereinafter should not be construed to require that the steps recited therein be performed in alphabetical order or in the order in which they are recited, and should not be construed to exclude two or more steps being performed contemporaneously during at least a portion of the duration of one of said steps.

The invention claimed is:

1. A window system comprising:
a window pane comprising an automatically adjusting photochromatic material formulated to attenuate incoming light in a local area of the photochromatic material in response to a solar flux intensity of the incoming light in the local area being greater than or equal to a threshold intensity while areas outside the local area of the photochromatic material that are subjected to solar flux intensity less than the threshold intensity do not attenuate incoming light;
an electronic dimmable window; and
a dust cover positioned such that the electronic dimmable window is between the automatically adjusting photochromatic material in the window pane and the dust cover.

2. The window system of claim 1, wherein the automatically adjusting photochromatic material is formulated with Azobenzene.

3. The window system of claim 1, wherein the automatically adjusting photochromatic material is formulated to reflect or absorb light waves in the infrared and visible spectrums having a wavelength from 390 nm to 2500 nm.

4. The window system of claim 1, wherein the threshold intensity is in a range of about 15 btu/hr-ft$^2$ to about 660 btu/hr-ft$^2$.

5. The window system of claim 1, wherein the window pane further comprises an infrared reflection coating, and the threshold intensity is in a range of about of about 7 btu/hr-ft$^2$ to about 898 btu/hr-ft$^2$.

6. The window system of claim 1, wherein the window pane is a laminated window pane having an inner pane bonded with an outer pane at a bond line between an outer surface of the inner pane and an inner surface of the outer pane, the automatically adjusting photochromatic material applied to an inner surface of the inner pane.

7. The window system of claim 1, wherein the window pane is a laminated window pane having an inner pane bonded with an outer pane at a bond line between an outer surface of the inner pane and an inner surface of the outer pane, the automatically adjusting photochromatic material applied to an outer surface of the outer pane.

8. The window system of claim 1, wherein the window pane is a laminated window pane having an inner pane bonded with an outer pane at a bond line between an outer surface of the inner pane and an inner surface of the outer pane, the automatically adjusting photochromatic material applied at the bond line between the inner pane and the outer pane.

9. The window system of claim 1, wherein the window pane is a non-laminated window pane with an air gap between an inner pane and an outer pane, the automatically adjusting photochromatic material applied to an outer surface of the outer pane.

10. The window system of claim 1, wherein the window pane is a non-laminated window pane with an air gap between an inner pane and an outer pane, the automatically adjusting photochromatic material applied to an inner surface of the outer pane.

11. The window system of claim 1, wherein the window pane is a non-laminated window pane with an air gap between an inner pane and an outer pane, the automatically adjusting photochromatic material applied to an outer surface of the inner pane.

12. The window system of claim 1, wherein the window pane is a non-laminated window pane with an air gap between an inner pane and an outer pane, the automatically adjusting photochromatic material applied to an inner surface of the inner pane.

13. A method of attenuating light in a window system comprising an electronic dimmable window, the method comprising the steps of:
integrating an automatically adjusting photochromatic material into a window pane of the window system such that the electronic dimmable window is positioned between the automatically adjusting photochromatic material in the window pane and a dust cover of the window system, the automatically adjusting photochromatic material formulated to attenuate incoming light in a local area of the photochromatic material in response to a solar flux intensity of the incoming light in the local area being greater than or equal to a threshold intensity while areas outside the local area of the photochromatic material that are subjected to solar flux intensity less than the threshold intensity do not attenuate incoming light.

14. The method of claim 13, further comprising formulating the automatically adjusting photochromatic material with Azobenzene.

15. The method of claim 13, further comprising formulating the automatically adjusting photochromatic material to reflect or absorb light waves in the infrared and visible spectrums having a wavelength from 390 nm to 2500 nm.

16. The method of claim 13, wherein the integrating the automatically adjusting photochromatic material into the window pane comprises applying the automatically adjusting photochromatic material to an outer surface of an outer pane of the window pane.

17. The method of claim 13, wherein the integrating the automatically adjusting photochromatic material into the window pane comprises applying the automatically adjusting photochromatic material to an inner surface of an inner pane of the window pane.

18. The method of claim 13, wherein the integrating the automatically adjusting photochromatic material into the window pane comprises applying the automatically adjusting photochromatic material between an outer surface of an inner pane of the window pane and an inner surface of an outer pane of the window pane.

19. The method of claim 13, further comprising the step of:
integrating an infrared reflection coating into the window pane.

20. The method of claim 13, wherein the threshold intensity is in a range of about 15 btu/hr-ft$^2$ to about 660 btu/hr-ft$^2$.

21. The method of claim 19, wherein the threshold intensity is in a range of about of about 7 btu/hr-ft$^2$ to about 898 btu/hr-ft$^2$.

22. A window system comprising:
a window pane comprising an automatically adjusting photochromatic material formulated to attenuate incoming light in a local area of the photochromatic material in response to a solar flux intensity of the incoming light in the local area being greater than or equal to a threshold intensity in a range of about 7 btu/hr-ft$^2$ to about 898 btu/hr-ft$^2$;
an electronic dimmable window; and a dust cover positioned such that the electronic dimmable window is between the automatically adjusting photochromatic material in the window pane and the dust cover.

23. The window system of claim 22, wherein the automatically adjusting photochromatic material is formulated to not attenuate incoming light in areas outside the local area of the photochromatic material that are subjected to solar flux intensity less than the threshold intensity.

24. The window system of claim 22, wherein the threshold intensity is in a range of about 15 btu/hr-ft$^2$ to about 660 btu/hr-ft$^2$.

25. The window system of claim 22, wherein the window pane further comprises an infrared reflection coating.

26. The window system of claim 22, wherein the window pane is a laminated window pane wherein an inner pane is bonded with an outer pane at a bond line between an outer surface of the inner pane and an inner surface of the outer pane, the automatically adjusting photochromatic material applied to an inner surface of the inner pane.

27. The window system of claim 22, wherein the window pane is a laminated window pane wherein an inner pane is bonded with an outer pane at a bond line between an outer surface of the inner pane and an inner surface of the outer pane, the automatically adjusting photochromatic material applied to an outer surface of the outer pane.

28. The window system of claim 22, wherein the window pane is a laminated window pane wherein an inner pane is bonded with an outer pane at a bond line between an outer surface of the inner pane and an inner surface of the outer pane, the automatically adjusting photochromatic material applied at the bond line between the inner pane and the outer pane.

29. The window system of claim 22, wherein the window pane is a non-laminated window pane with an air gap between an inner pane and an outer pane, the automatically adjusting photochromatic material applied to an outer surface of the outer pane.

30. The window system of claim 22, wherein the window pane is a non-laminated window pane with an air gap between an inner pane and an outer pane, the automatically adjusting photochromatic material applied to an inner surface of the outer pane.

31. The window system of claim 22, wherein the window pane is a non-laminated window pane with an air gap between an inner pane and an outer pane, the automatically adjusting photochromatic material applied to an outer surface of the inner pane.

32. The window system of claim 22, wherein the window pane is a non-laminated window pane with an air gap between an inner pane and an outer pane, the automatically adjusting photochromatic material applied to an inner surface of the inner pane.

33. The window system of claim 22, wherein the automatically adjusting photochromatic material is formulated with Azobenzene.

* * * * *